(12) United States Patent
Ahn et al.

(10) Patent No.: US 8,611,003 B2
(45) Date of Patent: Dec. 17, 2013

(54) DOUBLE CLAD FIBER LASER DEVICE

(75) Inventors: Joon Tae Ahn, Daejeon (KR); Hong-Seok Seo, Daejeon (KR); Bong Je Park, Daejeon (KR); Dae Kon Oh, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 381 days.

(21) Appl. No.: 12/963,471

(22) Filed: Dec. 8, 2010

(65) Prior Publication Data
US 2011/0134512 A1    Jun. 9, 2011

(30) Foreign Application Priority Data

Dec. 8, 2009 (KR) .................. 10-2009-0121280
Sep. 16, 2010 (KR) .................. 10-2010-0091205

(51) Int. Cl.
*H04B 10/17* (2011.01)
*H01S 3/094* (2006.01)
*H01S 3/067* (2006.01)

(52) U.S. Cl.
USPC .................. 359/341.3; 359/341.1; 372/6

(58) Field of Classification Search
USPC .................. 359/341.1, 341.3; 372/6
See application file for complete search history.

(56) References Cited

U.S. PATENT DOCUMENTS

| | | | |
|---|---|---|---|
| 5,790,722 A | 8/1998 | Minden et al. | |
| 5,864,644 A | 1/1999 | DiGiovanni et al. | |
| 6,434,295 B1 * | 8/2002 | MacCormack et al. | 385/27 |
| 6,438,294 B1 * | 8/2002 | Lauzon et al. | 385/38 |
| 6,487,006 B1 * | 11/2002 | Chen | 359/341.32 |
| 6,546,169 B1 * | 4/2003 | Lin et al. | 385/39 |
| 6,816,652 B1 * | 11/2004 | Lin et al. | 385/39 |
| 6,831,934 B2 | 12/2004 | Wang et al. | |
| 6,836,607 B2 | 12/2004 | Dejneka et al. | |
| 7,016,573 B2 * | 3/2006 | Dong et al. | 385/46 |
| 7,064,889 B2 * | 6/2006 | Digonnet et al. | 359/341.1 |
| 7,742,669 B2 | 6/2010 | Dong et al. | |
| 2002/0168139 A1 * | 11/2002 | Clarkson et al. | 385/27 |
| 2004/0036955 A1 * | 2/2004 | Digonnet et al. | 359/341.1 |
| 2005/0105854 A1 * | 5/2005 | Dong et al. | 385/46 |
| 2011/0249321 A1 * | 10/2011 | Savage-Leuchs et al. | 359/341.3 |

FOREIGN PATENT DOCUMENTS

| | | |
|---|---|---|
| JP | 11-026843 A | 1/1999 |
| JP | 2009-537979 A | 10/2009 |
| KR | 10-0900793 | 5/2009 |

OTHER PUBLICATIONS

Ghisler et al., "Cladding-pumping of a Tm3+:Ho3+ silica fibre laser", Optics Communicatons vol. 132, pp. 474-478, (1996).*
Y. Jeong, et al., "Ytterbium-doped large-core fiber laser with 1.36 kW continuous-wave output power", Optics Express, vol. 12, No. 25, pp. 6088-6092 (2004).
M. Dubinskii, et al., "Highly scalable, resonantly cladding-pumped Er-doped fiber laser with record efficiency", Optics Letters, vol. 34, No. 10, pp. 1507-1509 (2009).

* cited by examiner

*Primary Examiner* — Eric Bolda
(74) *Attorney, Agent, or Firm* — Rabin & Berdo, P.C.

(57) ABSTRACT

Provided is a double clad fiber device. The double clad fiber device includes a double clad fiber, a pump combiner, at least one first laser diode, and at least one second laser diode. The double clad fiber includes a core and a clad. The pump combiner provides pump light to the core and the clad through one end of the double clad fiber, respectively. The at least one first laser diode provides first pump light to the clad through the pump combiner. The at least one second laser diode provides second pump light to the core through the pump combiner.

19 Claims, 4 Drawing Sheets

DOUBLE CLAD FIBER LASER DEVICE

CROSS-REFERENCE TO RELATED APPLICATIONS

This U.S. non-provisional patent application claims priority under 35 U.S.C. §119 of Korean Patent Application Nos. 10-2009-0121280, filed on Dec. 8, 2009, and 10-2010-0091205, filed on Sep. 16, 2010, the entire contents of which are hereby incorporated by reference.

BACKGROUND OF THE INVENTION

The present invention disclosed herein relates to a fiber laser device, and more particularly, to a double clad fiber laser device.

Most fiber laser devices having power of less than several watts generate laser light according to a core pumping method in which pump light is incident to a core for pumping. A semiconductor laser is mainly used as the pump light of the fiber laser. The power of the semiconductor laser light incident to the core is limited. Accordingly, the power of the laser light outputted by pumping is also limited. In order to generate laser light having higher power, more pump light has to be incident to fiber. If gain medium fiber having a double clad structure is used, a fiber laser having power characteristics of more than several tens of watts may be implemented.

A double clad fiber (DCF) may include a single mode core, a first clad, and a second clad. Rare-earth elements are added to the core. If pump line is provided to the core, electrons of excited rare-earth elements emit light. The light emitted from the rare-earth elements travels through the core, and oscillates as a laser through a resonator. The first clad of the double clad fiber is formed of silica glass. The second clad of the double clad fiber is formed of glass of low refractive index, in which silica glass contains fluorine, or polymer. Since a difference of the refractive index between the first clad and the second clad is usually greater than about 0.4, light of various incident angles may be accepted from a laser diode. Also, since the diameter of the first clad is relatively greater than the core, the optical receptivity of the first clad is considerably high. The double clad fiber constituted as described above may allow high-power pump light to be incident to the first clad in an array form at one time.

However, technology for enhancing the power of an amplifier or a fiber laser device using the double clad fiber is still required.

SUMMARY OF THE INVENTION

The present invention provides technology for reducing loss and enhancing power in an optical amplifier and a fiber laser device using double clad fiber.

Embodiments of the present invention provide double clad fiber devices including: a double clad fiber including a core and a clad; a pump combiner providing pump light to the core and the clad through one end of the double clad fiber, respectively; at least one first laser diode providing first pump light to the clad through the pump combiner; and at least one second laser diode providing second pump light to the core through the pump combiner.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Preferred embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

Figure 1:
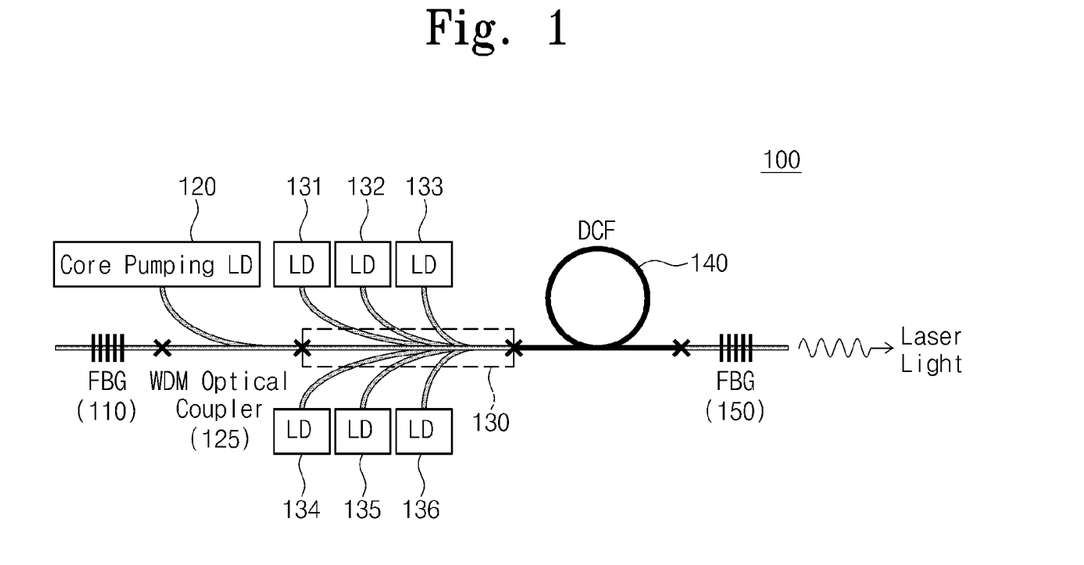
FIG. 1 is a diagram illustrating a double clad fiber laser device according to an embodiment of the present invention.

FIG. 1 is a diagram illustrating a double clad fiber laser device according to an embodiment of the present invention. Referring to FIG. 1, first and second Fiber Bragg Gratings (FBG) 110 and 150 may be formed at both sides of a double clad fiber laser device 100. The double clad fiber laser device 100 may include a core pumping laser diode 120, a wavelength division multiplexing (WDM) optical coupler 125, a plurality of clad pumping laser diodes 131, 132, 133, 134, 135 and 136, a pump combiner 130, and a double clad fiber 140.

The first and second fiber Bragg gratings 110 and 150 may serve as a resonator for laser oscillation. The Bragg grating may have excellent characteristics of selectively reflecting or diffracting a narrow wavelength band. The Bragg grating may be manufactured with various forms and structure to be widely used in various fields such as filters, resonators, couplers, diffractometers, sensors, optical pulse compressors, and dispersion compensators.

The first fiber Bragg grating 110 and the second fiber Bragg grating 150 may be formed at both sides of the double clad optical fiber laser device 100, respectively. Accordingly, the first fiber Bragg grating 110 and the second fiber Bragg grating 150 may mutually reflect light incident to a core or a clad of fiber constituting the double clad fiber laser device 100. The grating periods or lengths of the first fiber Bragg grating 110 and the second fiber Bragg grating 150 may be determined in consideration of the wavelength of laser light to be oscillated by pump light.

The first fiber Bragg grating 110 and the second fiber Bragg grating 150 may selectively reflect only a specific wavelength of spontaneous emission light generated by incident pump light. The spontaneous emission light reflected by the first fiber Bragg grating 110 and the second fiber Bragg grating 150 may be oscillated as a laser signal.

The first fiber Bragg grating 110 and the second fiber Bragg grating 150 may include a fiber type having a core with a grating and a clad surrounding the core, and a planar lightwave circuit type having a core (or core layer or waveguide) and a clad (or clad layer) surrounding the core. The first fiber Bragg grating 110 and the second fiber Bragg grating 150 may be substituted with reflection means such as a dielectric coating mirror.

The core pumping laser diode 120 may generate pump light incident to the core of the double clad fiber 140. The core pumping laser light outputted from the core pumping laser diode 120 may be incident to the core of the pump combiner by the wavelength division multiplexing (WDM) optical coupler 125. Laser light outputted from the clad pumping laser diodes 131, 132, 133, 134, 135 and 136 may be incident to the clad of the double clad fiber 140 by the pump combiner 130. The WDM optical coupler 125 may fully combine a wavelength of a pump light source, while fully transmitting a laser wavelength. The WDM optical coupler 125 may be an all-fiber type or a fiber pig-tailed thin film filter type. The WDM coupler 125 may be fusion-spliced between the fiber in which the first fiber Bragg grating 110 is formed and the pump combiner 130. Hereinafter, a coupling portion that is indicated as (X) denotes a fusion-spliced portion.

The double clad fiber 140 may include a core, a first clad, and a second clad. Rare-earth elements may be added to the core. If pump light is incident to the core, electrons of rare-earth elements excited by the pump light may emit light. The light emitted from the rare-earth elements may travel through the core, and may oscillate as a laser through a resonator.

The first clad of the double clad fiber 140 may be formed of silica glass. The second clad of the double clad fiber 140 may be formed of glass of low refractive index, in which silica glass contains fluorine, or polymer. Since a difference of the refractive index between the first clad and the second clad is usually greater than about 0.4, light of various incident angles may be accepted from a laser diode. Also, since the thickness of the first clad is relatively greater than that of a core (e.g., greater about ten times), the optical receptivity of the first clad is considerably high. Since the double clad fiber constituted as described above may allow high-power pump light to be incident to the first clad in an array form at one time, it is possible for high-power laser to travel to the first clad.

The pump light (core pump light and clad pump light) incident to the double clad fiber 140 may excite the rare-earth elements doped in the core while crossing the core. The excited rare-earth elements may emit excited light. The emitted excited light may travel through the core, may be amplified, and then may be oscillated as a laser through a laser resonator constituted with the first and second fiber Bragg gratings 110 and 150. The energy source of the laser formed in the core may be pump light travelling through the core and the clad. Examples of the rare-earth elements doped in the core may include Pr, Tb, Dy, Nd, Pm, Sm, Eu, Gd, Ho, Er, Tm, and Yb.

The second fiber Bragg grating 150 may be formed at the right side of the double clad fiber 140 to constitute the laser resonator together with the first fiber Bragg grating 110. The second fiber Bragg grating 150 may be a partial reflector. Therefore, laser light may not be fully reflected by the second fiber Bragg grating 150, but may be partially outputted to an output.

So far, the double clad fiber laser device 100 has been described as implementing pumping through the core as well as the clad of the double clad fiber 140. High-power and high-quality laser light may be provided through the pumping light incident to the core as well as the clad. Also, it may be provided as a single or multi mode fiber laser according to the condition of the core.

Figure 2:
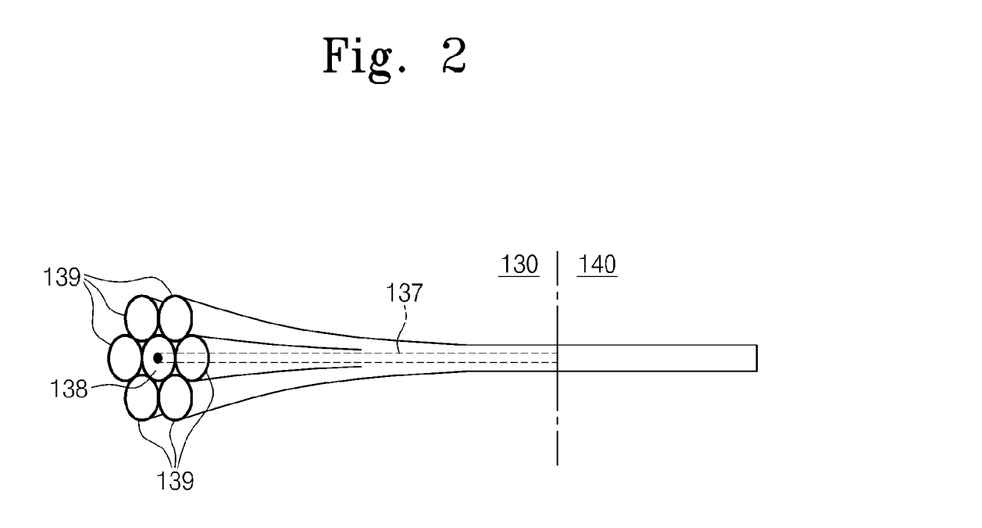
FIG. 2 is a diagram illustrating a pump combiner of an end coupling type according to an embodiment of the present invention.

FIG. 2 is a diagram illustrating the pump combiner 130 of FIG. 1. Referring to FIG. 2, the pump combiner 130 of end coupling type is shown to be connected to the double clad fiber 140.

Referring to the section of the pump combiner 130, a central fiber among seven fiber strands may be a single mode core fiber 138 having a core 137. The six fiber strands 139 surrounding the single mode core fiber 138 may be connected to clad pumping laser diodes 131, 132, 133, 134, 135 and 136. The double clad fiber 140 may be fusion-spliced to the right side of the pump combiner, or a multi-mode core fiber may be optically coupled between the double clad fiber 140 and the pump combiner 130.

Here, the power of the core pumping laser diode 120 may be incident to the core 137 through the WDM optical coupler 125. Accordingly, the power of the clad pumping laser diodes 131, 132, 133, 134, 135 and 136 incident through the six fiber strands 139 may be incident to the clad layer of the double clad fiber 140. Also, the pump light outputted from the core pumping laser diode 120 may be incident to the core 137 to travel to the core of the double clad fiber 140 that is fusion-spliced.

Thus, the pump light incident to the clad and core of the double clad fiber 140 may excite the rare-earth elements doped in the core of the double clad fiber, and the excited light may be amplified in a resonator including the first and second fiber Bragg gratings 110 and 150.

Figure 3:
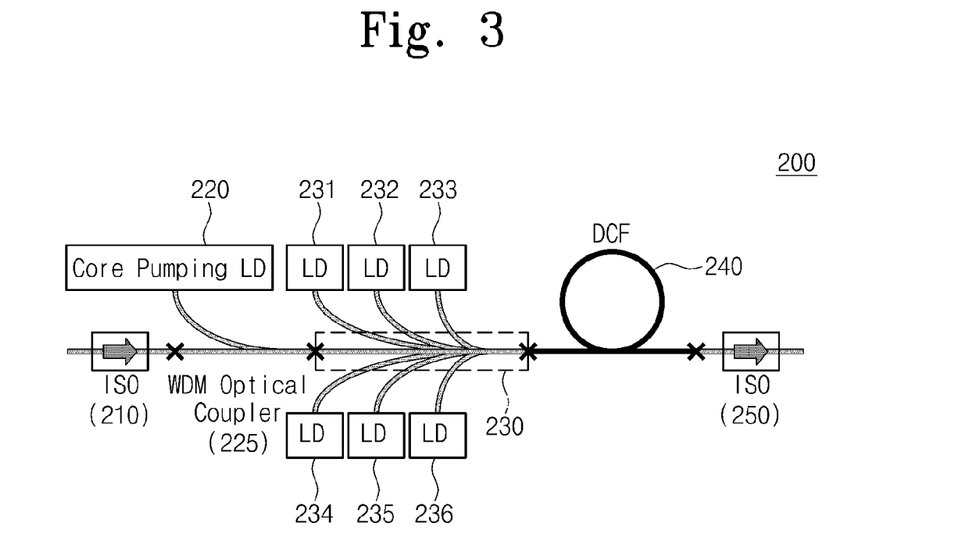
FIG. 3 is a diagram illustrating a double clad optical fiber amplifier according to an embodiment of the present invention.

FIG. 3 is a diagram illustrating an optical amplifier including the pump combiner described in FIG. 2. Referring to FIG. 3, first and second optical isolators 210 and 250 may be connected to both sides of a double clad fiber amplifier 200. The double clad fiber amplifier 200 may include a core pumping laser diode 220, a wavelength division multiplexing optical coupler 225, clad pumping laser diodes 231, 232, 233, 234, 235 and 236, a pump combiner 230, and a double clad fiber 240. The first and second optical isolators 210 and 250 may be devices for blocking or inhibiting retro reflection of inputted light or light traveling in a direction opposite to the traveling direction of light. The first and second optical isolators 210 and 250 may use a great Faraday rotation angle that a magnetic substance has. Accordingly, light incident to the first optical isolator 210 may be amplified by the double clad fiber optical amplifier 200 to be outputted to the second optical isolator 250.

The core pumping laser diode 220 may generate pump light inputted to the core of the double clad fiber 240. The core pumping laser outputted from the core pumping laser diode 220 may be incident to the core of the pump combiner 230 by the wavelength division (WDM) optical coupler 225. Laser light outputted from the clad pumping laser diodes 231, 232, 233, 234, 235 and 236 may be incident to a clad layer of the double clad fiber 240 by the pump combiner 230. The WDM optical coupler 225 may fully combine a wavelength of a pump light source, while fully transmitting a laser wavelength. The WDM optical coupler 225 may be an all-fiber type or a fiber pig-tailed thin film filter type.

The double clad fiber 240 may include a core, a first clad, and a second clad. Rare-earth elements may be added to the core. Clad pumping laser may be incident to the first clad, and core pumping laser may be incident to the core. The energy level of the rare-earth elements doped in the core may shift from the ground state to the excited state by the pump light incident to the clad and the core. In this case, the incident light may be amplified by the spontaneous emission and the stimulated emission of the rare-earth elements. The spontaneous emission may denote a phenomenon in which the rare-earth elements emit light having a certain wavelength. The stimulated emission may denote a phenomenon in which the rare-earth elements emit light having a wavelength identical to that of the incident light. Examples of the rare-earth elements doped in the core may include Pr, Tb, Dy, Nd, Pm, Sm, Eu, Gd, Ho, Er, Tm, and Yb.

The incident light amplified in the double clad fiber 240 may be outputted by the second optical isolator 250.

So far, the double clad fiber amplifier 200 in which pump light is provided to the clad and core of the double clad fiber 240 has been described. High gain may be provided with respect to the incident light through the pump light incident to the core as well as the clad.

Figure 4:
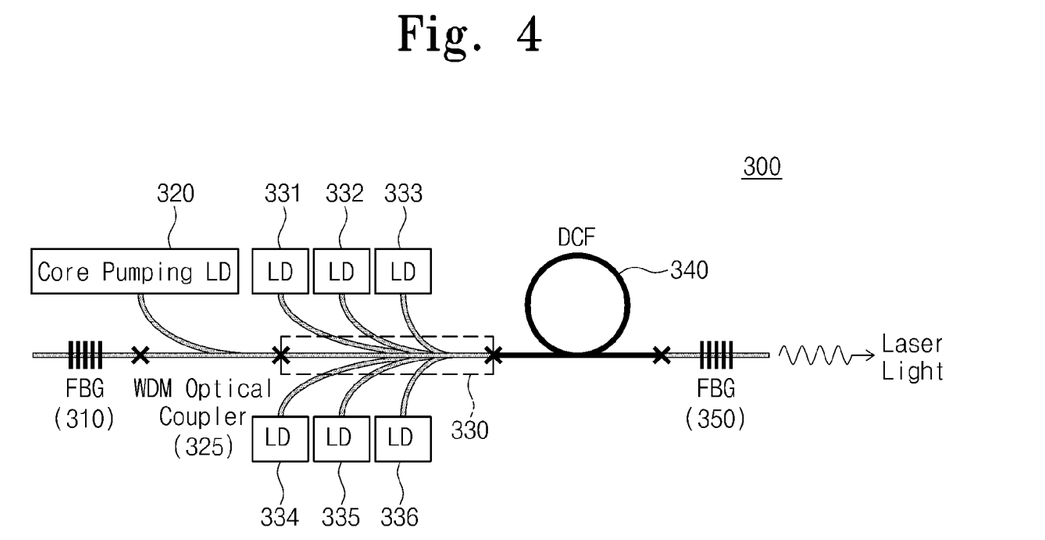
FIG. 4 is a diagram illustrating a double clad fiber laser device according to another embodiment of the present invention.

FIG. 4 is a diagram illustrating a double clad fiber laser device according to another embodiment of the present invention. Referring to FIG. 4, first and second fiber Bragg gratings 310 and 350 may be connected to both sides of a double clad fiber laser device 300. The double clad fiber laser device 300 may include a core pumping laser diode 320, a wavelength division multiplexing optical coupler 325, clad pumping laser diodes 331, 332, 333, 334, 335 and 336, a pump combiner 330 of a side coupling type, and a double clad fiber 340.

The first and second fiber Bragg gratings 310 and 350 may constitute a laser resonator. The first and second fiber Bragg gratings 310 and 350 may be formed at both side of the double clad fiber laser device 300, respectively. Accordingly, the first fiber Bragg grating 310 and the second fiber Bragg grating 350 may mutually reflect pump light incident to a core or a clad of fiber constituting the double clad fiber laser device 300. The grating periods Λ or lengths of the first fiber Bragg grating 310 and the second fiber Bragg grating 350 may be determined in consideration of the wavelength of laser light to be oscillated by pump light. As a reflection means for constituting a laser resonator, a fiber Bragg grating (FBG) has been proposed in an embodiment of the present invention, but the present invention are not limited thereto. The first and second fiber Bragg gratings 310 and 350 may be substituted with reflection means such as a dielectric coating mirror.

The core pumping laser diode 320 may generate pump light incident to the core of the double clad fiber 340. The pump light outputted from the core pumping laser diode 320 may be incident to the core of the pump combiner 330 by the WDM optical coupler 325. The pump light outputted from the clad pumping laser diodes 331, 332, 333, 334, 335 and 336 may be incident to a clad layer of the double clad fiber 340 by the pump combiner 330. The WDM optical coupler 325 may be an all-fiber type or a fiber pig-tailed thin film filter type.

The pump combiner 330 may be configured with a side coupling type. The pump combiner 330 inputting the core pump light and the clad pump light to the double clad fiber 340 by the side coupling type may be configured with two types according to whether the core is doped. One type is that the core of the central fiber among seven fiber strands is formed of undoped double clad fiber undoped with rare-earth elements. The other type is that the core of the central fiber is formed of doped double clad fiber doped with rare-earth elements by the same method as the double clad fiber 340.

FIG. 4 shows a double clad fiber laser device including a pump combiner in which the core of the central fiber is formed of undoped double clad fiber.

The double clad fiber 340 may include a core, a first clad, and a second clad. Rare-earth elements may be added to the core. If pump light is incident to the core, electrons of the rare-earth elements excited by the pump light emit light. The light emitted from the rare-earth elements may travel through the core, and may oscillate as laser light by a laser resonator configured with the first and second fiber Bragg gratings 310 and 350.

The first clad of the double clad fiber 340 may be formed of silica glass. The second clad of the double clad fiber 340 may be formed of glass of low refractive index, in which silica glass contains fluorine, or polymer. Since a difference of the refractive index between the first clad and the second clad is usually greater than about 0.4, light of various incident angles may be accepted from laser diodes 331, 332, 333, 334, 335 and 336. Also, since the thickness of the first clad is relatively greater than that of a core (e.g., greater about ten times), the optical receptivity of the first clad is considerably high. Since the double clad fiber constituted as described above may allow a high-power pump light source to be incident to the first clad in an array form at one time, it is possible for high-power laser to travel to the first clad.

The pump light (core pump light and clad pump light) incident to the double clad fiber 340 may excite the rare-earth elements doped in the core while crossing the core. The excited rare-earth elements may emit excited light. The emitted excited light may travel through the core, may be amplified, and then may be oscillated as a laser through a laser resonator constituted with the first and second fiber Bragg gratings 310 and 350. The energy source of the laser formed in the core may be pump light travelling through the core and the clad. Examples of the rare-earth elements doped in the core may include Pr, Tb, Dy, Nd, Pm, Sm, Eu, Gd, Ho, Er, Tm, and Yb.

So far, the double clad fiber laser device 300 has been described as implementing pumping through the core as well as the clad of the double clad fiber 340. Particularly, the pump combiner 330 may allow the core and clad pumping light to be incident to the double clad fiber 340 by a side coupling method. High-power and high-quality laser light may be provided through the pumping light incident to the core as well as the clad. Also, it may be provided as a single or multi mode fiber laser according to the condition of the core.

Figure 5:
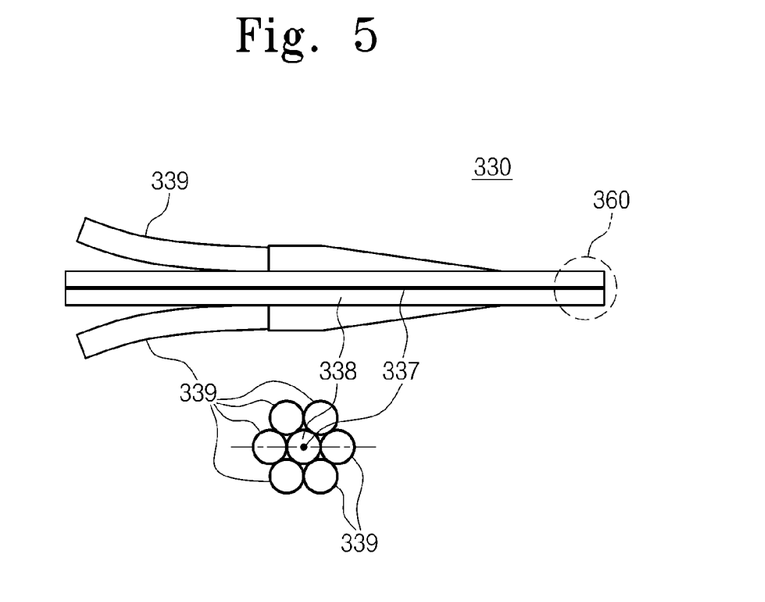
FIG. 5 is a diagram illustrating a pump combiner of a side coupling type according to an embodiment of the present invention.

FIG. 5 is a cross-sectional view illustrating the structure of the pump combiner 330 of FIG. 4. Referring to FIG. 5, the cross section of the pump combiner 330 of a side coupling type is shown.

Referring to the cross section of the pump combiner 330, a central fiber among seven fiber strands may be a double clad fiber 360 including a core 337 and a clad 338. The six fiber strands 339 surrounding the double clad fiber 360 may be connected to clad pumping laser diodes 331, 332, 333, 334, 335 and 336. The six fiber strands 339 may allow pumping light outputted from the clad pumping laser diodes 331, 332, 333, 334, 335 and 336 to be incident to the clad 338 of the double clad fiber 360.

The double clad fiber 360 including the core 337 and the clad 338 may be divided into doped double clad fiber and undoped double clad fiber according to whether the core 337 is doped or not. When the double clad fiber 360 is formed by an undoped type, the double clad fiber 360 of the pump combiner 330 may be fusion-spliced to the double clad fiber 340 for optical amplification. However, when the double clad fiber 360 is formed by a doped type, the double clad fiber 360 of the pump combiner 330 may used by extending the double clad fiber 340 for optical amplification.

Figure 6:
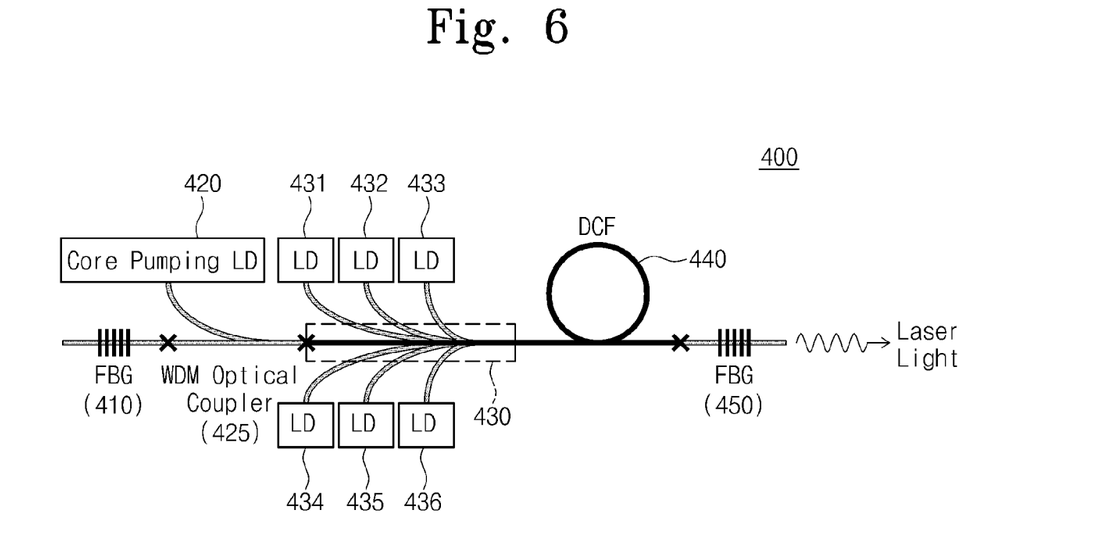
FIG. 6 is a diagram illustrating a double clad fiber laser device according to still another embodiment of the present invention.

FIG. 6 is a diagram illustrating a double clad fiber laser device according to still another embodiment of the present invention. Referring to FIG. 6, first and second fiber Bragg gratings 410 and 450 may be connected to both sides of a double clad fiber laser device 400. The double clad fiber laser device 400 may include a core pumping laser diode 420, a wavelength division multiplexing optical coupler 425, clad pumping laser diodes 431, 432, 433, 434, 435 and 436, a pump combiner 430 of a side coupling type, and a double clad fiber 440.

The first and second fiber Bragg gratings 410 and 450 may be formed at both sides of the double clad fiber laser device 400 as a resonator of the double clad fiber laser device 400. The first and second fiber Bragg gratings 410 and 450 formed at the both sides of the double clad fiber laser device 400 may be substituted with reflection means such as a dielectric coating mirror.

The core pumping laser diode 420 may generate pump light incident to the core of the double clad fiber 440. The pump light outputted from the core pumping laser diode 420 may be incident to the core of the pump combiner 430 by the WDM optical coupler 425. The pump light outputted from the clad pumping laser diodes 431, 432, 433, 434, 435 and 436 may be incident to a clad layer of the double clad fiber 440 by the pump combiner 430. The WDM optical coupler 425 may be an all-fiber type or a fiber pig-tailed thin film filter type.

The pump combiner 430 may be configured with a side coupling type. Here, the central fiber of the pump combiner 430 may be formed of the same material as the double clad fiber 440. Accordingly, the double clad fiber 440 may be extended to be used the central fiber of the pump combiner 430. In this case, the pump combiner 430 may be optically coupled without fusion-splice to the double clad fiber 440. Accordingly, there is no fusion-spliced portion that is indicated as (X) between the pump combiner 430 and the double clad fiber 440. In this case, when only the clad pumping laser diodes 431, 432, 433, 434, 435 and 436 are used, the double clad fiber between a point coupled with the WDM optical coupler 425 and a point where the clad pumping laser diodes 431, 432, 433, 434, 435 and 436 are coupled may not be optically pumped. If there is a gain medium that is not optically pumped in a laser resonator, the gain medium may absorb laser light to reduce the laser power. Therefore, the laser power may further increase when additional optical pumping is performed using the core pumping laser diode 420 as proposed in the present invention.

The double clad fiber 440 may include a core, a first clad, and a second clad. Rare-earth elements may be added to the core. If pump light is incident to the core, electrons of the rare-earth elements excited by the pump light emit light. The light emitted from the rare-earth elements may travel through the core, and may oscillate as laser light by a resonator configured with the first and second fiber Bragg gratings 410 and 450.

The core of the central fiber of the pump combiner 430 and the double clad fiber 440 may be doped with rare-earth elements. Examples of the rare-earth elements doped in the core may include Pr, Tb, Dy, Nd, Pm, Sm, Eu, Gd, Ho, Er, Tm, and Yb.

So far, the double clad fiber laser device 400 has been described as implementing pumping through the core as well as the clad of the double clad fiber 440. Particularly, the pump combiner 430 may allow the core and clad pumping light to be incident to the double clad fiber 440 by a side coupling method. High-power and high-quality laser light may be provided through the pumping light incident to the core as well as the clad.

Figure 7:
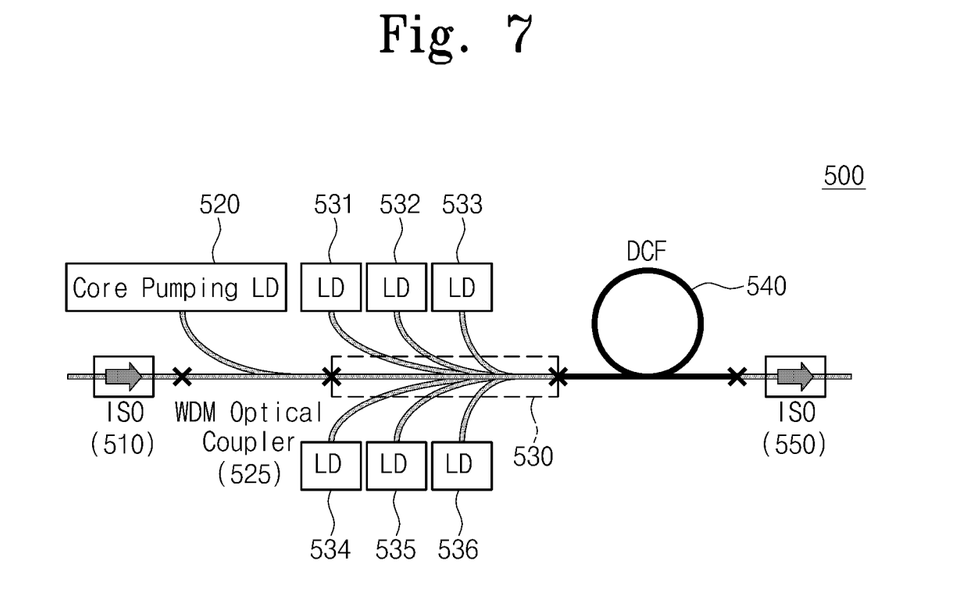
FIG. 7 is a diagram illustrating a double clad optical fiber amplifier according to another embodiment of the present invention.
Figure 8:
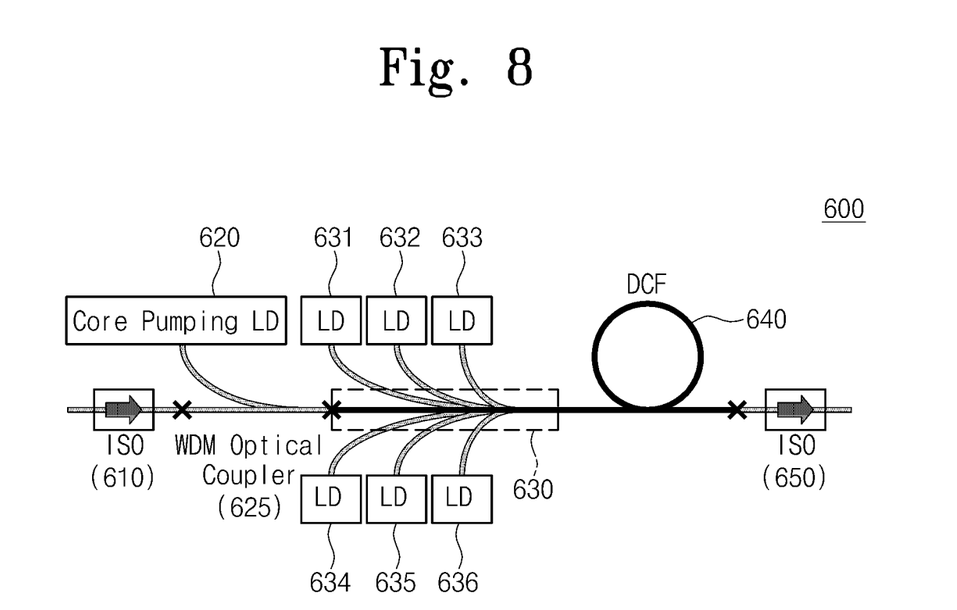
FIG. 8 is a diagram illustrating a double clad optical fiber amplifier according to still another embodiment of the present invention.

FIGS. 7 and 8 are diagrams illustrating exemplary optical amplifiers receiving clad pump light by a side coupling method. FIG. 7 shows an exemplary optical amplifier in which the central fiber of a pump combiner 530 is formed by a method different from that of a double clad fiber 540 and is fusion-spliced. FIG. 8 shows an exemplary optical amplifier in which the central fiber of the pump combiner 630 is configured with extending double clad fiber 640.

Referring to FIG. 7, first and second optical isolators 510 and 550 may be connected to both sides of a double clad fiber amplifier 500. The double clad fiber amplifier 500 may include a core pumping laser diode 520, a wavelength division multiplexing optical coupler 525, clad pumping laser diodes 531, 532, 533, 534, 535 and 536, a pump combiner 530, and a double clad fiber 540.

The first and second optical isolators 510 and 550 may be devices for blocking or inhibiting retro reflection of inputted light or light traveling in a direction opposite to the traveling direction of light. The first and second optical isolators 510 and 550 may use a great Faraday rotation angle that a magnetic substance has. Accordingly, light incident to the first optical isolator 510 may be amplified by the double clad fiber optical amplifier 500 to be outputted to the second optical isolator 550.

The core pumping laser diode 520 may generate pump light inputted to the core of the double clad fiber 540. The core pumping laser outputted from the core pumping laser diode 520 may be incident to the core of the pump combiner 530 by the wavelength division (WDM) optical coupler 525. Laser light outputted from the clad pumping laser diodes 531, 532, 533, 534, 535 and 536 may be incident to a clad layer of the double clad fiber 540 by the pump combiner 530.

The pump combiner 530 may be configured by a side coupling method. The core of the central fiber among seven fiber strands constituting the pump combiner 530 may be formed of undoped double clad fiber undoped with rare-earth elements. Accordingly, since the central fiber of the pump combiner 530 is formed of different materials, it has to be fusion-spliced to the double clad fiber 540.

The double clad fiber 540 may include a core, a first clad, and a second clad. Rare-earth elements may be added to the core. Clad pumping laser may be incident to the first clad, and core pumping laser may be incident to the core. The energy level of the rare-earth elements doped in the core may shift from the ground state to the excited state by the pump light incident to the clad and the core. In this case, the incident light may be amplified by the spontaneous emission and the stimulated emission of the rare-earth elements. The spontaneous emission may denote a phenomenon in which the rare-earth elements emit light having a certain wavelength. The stimulated emission may denote a phenomenon in which the rare-earth elements emit light having a wavelength identical to that of the incident light. Examples of the rare-earth elements doped in the core may include Pr, Tb, Dy, Nd, Pm, Sm, Eu, Gd, Ho, Er, Tm, and Yb. The incident light amplified in the double clad fiber 540 may be outputted by the second optical isolator 550.

So far, the double clad fiber amplifier 500 in which pump light is provided to the clad and core of the double clad fiber 540 has been described. High amplification factor may be provided with respect to the incident light through the pump light incident to the core as well as the clad.

Referring to FIG. 8, first and second optical isolators 610 and 650 may be connected to both sides of a double clad fiber amplifier 600. The double clad fiber amplifier 600 may include a core pumping laser diode 620, a wavelength division multiplexing optical coupler 625, clad pumping laser diodes 631, 632, 633, 634, 635 and 636, a pump combiner 630, and a double clad fiber 640.

The first and second optical isolators 610 and 650 may block or inhibit retro reflection of inputted light or light traveling in a direction opposite to the traveling direction of light. The first and second optical isolators 610 and 650 may use a great Faraday rotation angle that a magnetic substance has. Accordingly, light incident to the first optical isolator 610 may be amplified by the double clad fiber optical amplifier 600 to be outputted to the second optical isolator 650.

The core pumping laser diode 620 may generate pump light inputted to the core of the double clad fiber 640. The core pumping laser outputted from the core pumping laser diode 620 may be incident to the core of the pump combiner 630 by the wavelength division (WDM) optical coupler 625. Laser light outputted from the clad pumping laser diodes 631, 632, 633, 634, 635 and 636 may be incident to a clad layer of the double clad fiber 640 by the pump combiner 630.

The pump combiner 630 may be configured by a side coupling method. The central fiber among seven fiber strands constituting the pump combiner 630 may be used by extending the double clad fiber 640. Accordingly, the central fiber of the pump combiner 630 need not to be fusion-spliced to the double clad fiber 640.

The double clad fiber 640 may include a core, a first clad, and a second clad. Rare-earth elements may be added to the core. Clad pumping laser may be incident to the first clad, and core pumping laser may be incident to the core. The energy level of the rare-earth elements doped in the core may shift from the ground state to the excited state by the pump light incident to the clad and the core. In this case, the incident light may be amplified by the spontaneous emission and the stimulated emission of the rare-earth elements. The spontaneous emission may denote a phenomenon in which the rare-earth elements emit light having a certain wavelength. The stimulated emission may denote a phenomenon in which the rare-earth elements emit light having a wavelength identical to that of the incident light. Examples of the rare-earth elements doped in the core may include Pr, Tb, Dy, Nd, Pm, Sm, Eu, Gd, Ho, Er, Tm, and Yb. The incident light amplified in the double clad fiber 640 may be outputted by the second optical isolator 550.

So far, the double clad fiber amplifier 600 in which pump light is provided to the clad and core of the double clad fiber 640 has been described. High amplification factor may be provided with respect to the incident light through the pump light incident to the core as well as the clad.

According to embodiments of the present invention described above, a double clad fiber-based laser device enabling both of core pumping and clad pumping can be implemented.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A double clad fiber device comprising:
  a double clad fiber comprising a core and a clad;
  a pump combiner providing pump light to each of the core and the clad through a portion of the double clad fiber, the pump combiner being doped with rare-earth elements;
  at least one first laser diode providing first pump light to the clad through the pump combiner; and
  at least one second laser diode providing second pump light to the core through the pump combiner.

2. The double clad fiber device of claim 1, wherein the clad of the double clad fiber comprises:
  a first clad surrounding the core; and
  a second clad disposed around a circumference of the first clad.

3. The double clad fiber device of claim 2, wherein the pump combiner provides the first pump light to the first clad by an end coupling thereof.

4. The double clad fiber device of claim 2, wherein the pump combiner provides the first pump light to the first clad by a side coupling thereof.

5. The double clad fiber device of claim 1, wherein the pump combiner comprises:
  a central fiber optically coupled to the double clad fiber; and
  a plurality of fibers disposed around a circumference of the central fiber to allow the first pump light to be incident to the clad of the double clad fiber.

6. The double clad fiber device of claim 5, wherein the central fiber comprises an extending portion of the double clad fiber, or a single mode core fiber fusion-spliced to the double clad fiber.

7. The double clad fiber device of claim 1, further comprising a wavelength division multiplexing optical coupler allowing the second pump light to be incident to the core of the pump combiner.

8. The double clad fiber device of claim 7, further comprising:
  a first fiber Bragg grating disposed at one end of the wavelength division multiplexing optical coupler; and
  a second fiber Bragg grating disposed at the other end of the double clad fiber.

9. The double clad fiber device of claim 8, wherein the first and second fiber Bragg gratings reflect spontaneous emission light generated in the core by the first and second pump light, respectively, to oscillate as laser light.

10. The double clad fiber device of claim 9, wherein the laser light is outputted in a direction corresponding to at least one side of the first fiber Bragg grating and the second fiber Bragg grating.

11. The double clad fiber device of claim 7, wherein further comprising:
  a first optical isolator connected to one end of the wavelength division multiplexing optical coupler; and
  a second optical isolator connected to the other end of the double clad fiber.

12. The double clad fiber device of claim 11, wherein light incident to the first optical isolator is amplified in the core of the double clad fiber to be outputted by the second optical isolator.

13. The double clad fiber device of claim 1, wherein the core is doped with rare-earth elements that emit light excited by the first pump light or the second pump light.

14. The double clad fiber device of claim 13, wherein the rare-earth elements comprise at least one of Yb, Pr, Er, and Tm.

15. The double clad fiber device of claim 1, wherein a core of the pump combiner includes the rare-earth elements.

16. The double clad fiber device of claim 15, wherein the pump combiner includes at least one strand surrounding the core of the pump combiner and coupling the pump combiner to the at least one first laser diode, and each of the strands is free of any rare-earth elements.

17. The double clad fiber device of claim 15, wherein the core of the double clad fiber includes rare-earth elements.

18. The double clad fiber device of claim 17, wherein the core of the pump combiner touches the core of the double clad fiber.

19. The double clad fiber device of claim 18, wherein the rare-earth elements of the pump combiner and the core of the double clad fiber comprise at least one of Yb, Pr, Er, and Tm.

\* \* \* \* \*